United States Patent Office 3,315,270
Patented Apr. 18, 1967

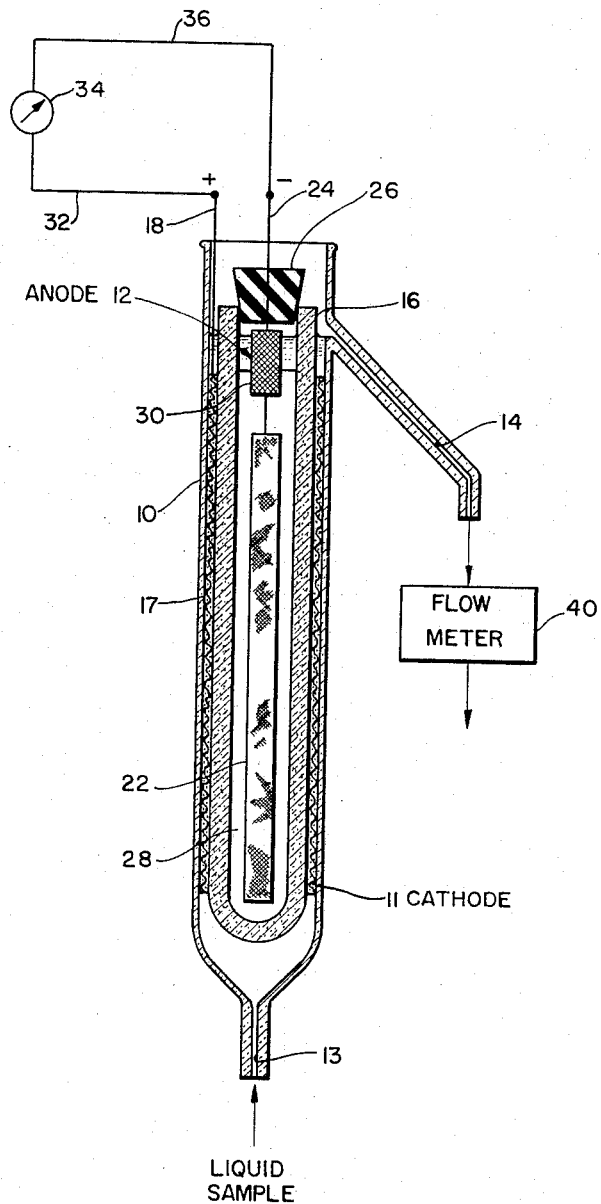

3,315,270
DISSOLVED OXIDANT ANALYSIS
Paul A. Hersch, Fullerton, Calif., assignor to Beckman Instruments, Inc., a corporation of California
Filed Apr. 16, 1964, Ser. No. 363,661
14 Claims. (Cl. 204—1)

This application is a continuation-in-part of my copending application Serial No. 291,418, filed June 28, 1963, now abandoned, and assigned to the same assignee as the present application.

This invention relates to liquid analysis and, more particularly, to an improved galvanic monitoring process and apparatus for the continuous analysis of oxidants dissolved in a liquid sample stream.

For many years efforts have been made to develop efficient, accurate and inexpensive devices for determining chlorine in liquid samples. One of the earliest known chlorine analyzers consisted of a platinum rod cathode axially aligned in a copper tube which was the anode of the cell and which carried the liquid sample. The cell produced a current but the signal depended on several factors apart from the rate of supply of the chlorine in the sample. A more recently developed chlorine analyzer used a certain catalytic reagent such as ferrous salt. Although this instrument is claimed to achieve a ready conversion of chlorine into electric terms, it is somewhat cumbersome in that it requires a special feeding system for the ferrous reagent.

There is presently an urgent requirement for a simple and inexpensive device which will provide a direct measure of dissolved oxidants in a sample stream. The term "oxidant" as used herein is to be understood as meaning an electron acceptor. One important field in which such a device is required is in the measurement of disinfectants used in swimming pools, such as halogens or organic halogen donors. Some disinfectants used in the treatment of swimming pool water are halogens, such as bromine and chlorine, and organic halogen donors, such as chloramines B and T, N-chlorosuccinimide, di- and tri-chloroisocyanuric acid and mono- and dibromo-dimethyl-hydantoin. With a device which continuously measures the halogen or halogen donor content of water utilized in swimming pools, the current generated could be used to automatically sensitize relays for operating the feeding devices for disinfectant.

What is needed, therefore, and constitutes the principal object of the present invention, is a simple and inexpensive method and apparatus for monitoring liquids containing dissolved oxidants.

Another object of the invention is to provide an electrochemical method and apparatus for measuring dissolved oxidants in a liquid sample wherein the conversion of the oxidant to current is determined solely by Faraday's law, and is not affected by the geometry of the cell or by temperature.

Still a further object of the invention is to provide a galvanic monitoring method and apparatus for determining the dissolved oxidant content of a liquid stream, which method and apparatus do not normally require an electrolyte separate from the sample stream nor an external electromotive force.

According to the principal aspect of the invention, an oxidant, such as a halogen or an organic halogen donor, dissolved in a liquid sample is carried to a galvanic cell which is provided with an anode of active carbon and a cathode of an inert conductive material. When the halogen passes over the cathode, the carbon anode is electrochemically oxidized. The free energy of oxidation of the carbon anode, coupled with the reduction of the halogen to a halide, is converted into electrical energy. The current generated in the cell is a measure of the rate of supply of the halogen and is related to this rate by Faraday's law. Thus, a substantially coulometric yield is provided by the cell.

Other objects, aspects and advantages will become apparent from the following description taken in connection with the accompanying drawing which is a sectional view of the preferred embodiment of the galvanic cell of the present invention.

The galvanic cell of the present invention is both simple in construction and inexpensive to manufacture. As seen in detail in the drawing, the invention comprises generally a glass cell or receptacle 10, a cathode 11 and an anode generally indicated by numeral 12. The cell includes a capillary inlet 13 in its lower end and a capillary outlet 14 extending downwardly from the side of the cell near its upper end. Disposed in the cell is a container 16 formed of a porous material such as porous glass or a porous ceramic. The container 16 should be of sufficient porosity to permit the ready flow of ions through the walls of the container and to permit sample water to fill the container above the anode material to the same level as the water in the receptacle 10 when water is initially introduced into the cell. However, the container should not be so porous as to permit sample water outside of the container to flow into the interior thereof during normal operation of the cell where it would mix with the anode material. The outer wall of the container 16 is preferably positioned close to the inner wall of the cell 10 to provide a narrow annular passage 17. The cathode 11 is formed of an insert conductive material preferably in the form of a cylinder which substantially occupies the annular passage 17. For example, the cathode may be a screen formed of a noble metal, such as platinum, or may be an inactive carbonaceous fibrous material such as graphite cloth or graphite felt. In the case of carbonaceous fibrous materials, such materials may be provided with a catalytically active metal. For example, the graphite cloth or felt could be impregnated or coated or otherwise provided with a metal such as platinum. A wire 18 connected to the upper portion of the cathode 11 extends through the upper open end of the cell 10 for connection to an electrical circuit. The passage 17 should be relatively narrow so as to shorten the electrolytic path between the anode and cathode of the cell to the utmost. With a wider distance between the electrodes, the resistance of the cell may be too high, especially if the sample water has a low salt content.

It is highly desirable that the anode 12 of the cell is not exposed to the flowing sample. This is made possible by disposing the anode 12 of the cell within the porous container 16 so that it is outside the path of the flowing liquid sample. Generally, the anode must have some portion thereof formed of active carbon or silver so that the anode will readily undergo anodic oxidation and, unlike the cathode, not merely catalyze and conduct electronically. As illustrated, the anode comprises a piece of graphite cloth 22 placed in the porous container 16 and a wire 24 woven through the cloth, thereby being electrically connected thereto, and extending through a stopper 26 closing the upper end of the container 16. A sludge of active carbon 28 made by working the carbon into a suitable electrolyte fills a major portion of the compartment 16 in which the cloth 22 is buried. The carbon 28 should have a large, reactive surface and the particles, when forming a bed without compression, should have enough contact with each other to ensure conductive continuity throughout the bed. It is desirable to attach a small piece of platinum screen 30 to the wire 24 where the wire emerges from the carbon sludge to facilitate the escape of hydrogen should a cathodic "charging" of the carbon become desirable after prolonged use of the cell. Without some emerging area of the platinum, hydrogen bubbles could evolve inside the carbon bed and disrupt the bed during such charge. A conductor 32 connected to wire 18 electrically connects the cathode to one terminal of a current measuring device 34, such as a galvanometer, microammeter, or potentiometric recorder, while a second conductor 36 connects the wire 24 of the anode to the other terminal of the current measuring device 34.

A silver anode rather than the carbon anode 12 may be provided when there are high levels of the dissolved oxidant in the liquid sample and when the current drain is high. The ability of a carbon anode to oxidize is limited and the anode may reach this limit early in continuous use if the drain is excessive. A silver anode, for all practical purposes, never gives out and, therefore, in some cases may be more suitable. However, silver has the disadvantage that it produces a background current that has to be deducted from the signal, and may render it "noisy."

The anode may also take the form of a body of a carbonaceous fibrous material which is active, or inactive but impregnated with particles of active carbon or silver. In each case, the wire 24 would be embedded in the anode and be the only conductor required between the anode and the conductor 36.

A flowmeter 40 may be provided at the effluent end of the cell to measure the flow of fluid passing through the cell, which value is necessary in the determination of the dissolved oxidant content of the sample stream.

In the operation of this apparatus, the liquid sample, for example, the water from a swimming pool containing any of the disinfectants mentioned above, is made to enter the capillary inlet 13 of the cell by means of a pump or feeding device operating on gravity (not shown). The sample flows through the annular passage 17 and over the cathode 11. The liquid sample generally has sufficient conductivity to act as an electrolyte when it passes along the porous wall of the container 16. Generally, no separate body of electrolyte is provided in the cell. However, for waters very poor in salt content, a strong salt solution may have to be bleeded into the cell by conventional means. The chlorine, bromine, halogen donor, or other oxidant is reduced at the platinum screen cathode 17, picking up electrons from the circuit of the cell, while at the same time the carbon anode 20, at its surface, acquires oxygen anions from its environment and releases their electrons into the circuit, retaining the oxygen atom. Since the flowmeter 40 measures the flow rate of sample passing through the cell, the dissolved oxidant content of the sample may be readily determined by merely noting the flow rate of sample and measuring the current flowing in the circuit of the cell and then applying Faraday's law.

In agreement with Faraday's law, it has been found that by using the cell of the present invention, one part per million of bromine in a sample stream of one milliliter of water per minute produces 20 $\mu A$. output, independent of the temperature of the stream. This signal is sufficient, generally after some amplification, to sensitize relays to operate controls for the feed of disinfecting agent to a swimming pool. It is noted that by utilizing capillary inlets and outlets in the cell, a sufficiently low flow rate of sample passing through the cell is obtained which will ensure that a coulometric performance may be obtained or at least approached.

It can be readily appreciated that the present invention not only provides a very simple and inexpensive cell but one which does not depend on an external source of power, and in addition operates without requiring calibration nor, in general, a separate body of electrolyte. Furthermore, although the present invention has been described as being useful for the determination of oxidants dissolved in swimming pool water, it can be readily appreciated that the invention is not limited to such specific use but may be utilized in any other situation in which an oxidant is dissolved in water.

Although only two embodiments of the invention have been disclosed herein for purposes of illustration, it will be understood that various changes can be made in the form, details and arrangement and proportions of the various parts in such embodiments without departing from the spirit and scope of the invention as defined by the appended claims.

What is claimed is:

1. In a galvanic monitoring process for a liquid sample containing a dissolved oxidant, the steps comprising:
   providing a cell containing a cathode of an inert conductive material and an anode of active carbon with said cell being free of an electrolyte;
   conveying said liquid sample to said anode and cathode to electrically join said anode and cathode whereby said oxidant contained in said liquid sample is reduced at the cathode and the anode forms a surface oxide; and
   measuring the current across said electrode without driving a current through said electrode from an external electrical power source.

2. In a continuous galvanic monitoring process for a liquid stream containing a dissolved oxidant, the steps comprising:
   providing a cathode of an inert conductive material and an anode of active carbon;
   continuously conveying said liquid stream to said anode and cathode to electrically join said anode and cathode whereby said oxidant contained in the liquid stream is reduced at the cathode and the anode forms a surface oxide; and
   measuring the current across said electrodes without driving a current through said electrodes from an external electrical power source.

3. In a galvanic monitoring process for a liquid sample containing a dissolved oxidant, the steps comprising:
   providing a cathode of an inert conductive material and an anode of active carbon separated by a porous member;
   conveying said liquid sample over said cathode so that ions in said liquid sample pass through said porous member to said anode to electrically join said anode and cathode whereby said oxidant contained in said liquid sample is reduced at the cathode and the anode forms a surface oxide; and
   measuring the current across said electrodes without driving a current through said electrodes from an external electrical power source.

4. In a continuous galvanic monitoring process for a liquid stream containing a dissolved oxidant, the steps comprising:
   providing a cell divided into two separate compartments by a porous member with a cathode of an inert conductive material in one compartment and an active carbon anode in the other compartment;
   continuously conveying said liquid stream to the cathode in said one compartment so that ions in said liquid stream pass through said porous member to said other compartment to electrically join said anode and cathode whereby said oxidant contained in the liquid stream is reduced at the cathode and the anode forms a surface oxide; and
   measuring the current across said electrodes without driving a current through said electrodes from an external electrical power source.

5. A process as set forth in claim 1 wherein said cathode is selected from the group consisting of platinum and inactive carbon.

6. A galvanic cell adapted to monitor a liquid stream containing a dissolved oxidant comprising:
   a cell, a porous member dividing said cell into two separate compartments;

a cathode of inert conductive material disposed in one of said compartments;

an anode of active carbon disposed in the other of said compartments;

inlet means and outlet means in said one of said compartments for permitting the flow of liquid stream through said cell; and circuit means connected to said electrodes, said circuit means being devoid of an electrical power source associated therewith other than said electrodes for driving a current through said electrodes.

7. A galvanic cell as set forth in claim 6 wherein said anode and said cathode contact said porous member.

8. A galvanic cell adapted to continuously monitor a liquid stream containing a dissolved oxidant comprising:
a cell;
a substantially cylindrical container formed of porous material disposed in said cell and spaced from the walls of said cell to provide an annular space;
a cathode of an inert conductive material disposed in said annular space;
an anode of active carbon disposed in said container;
inlet and outlet means in said cell communicating with said annular space for permitting the flow of liquid stream through said cell and over said cathode; and
circuit means connected to said electrodes, said circuit means being devoid of an electrical power source associated therewith other than said electrodes for driving a current through said electrodes.

9. A galvanic cell as set forth in claim 8 wherein both said anode and said cathode are in close contact with said porous container.

10. A galvanic cell as set forth in claim 8 wherein said cathode is in the form of a cylinder substantially occupying said annular space.

11. A galvanic cell as set forth in claim 6 wherein said cathode is selected from the group consisting of platinum and inactive carbon.

12. A galvanic cell as set forth in claim 6 wherein said cathode is formed of an inactive carbonaceous fibrous material.

13. A galvanic cell as set forth in claim 8 wherein said cathode is permeable to the liquid stream whereby said stream flows through said cathode.

14. A galvanic cell adapted to continuously monitor a liquid stream containing a dissolved oxidant comprising:
an elongated cell;
a substantially cylindrical, closed container disposed lengthwise in said cell and spaced from the walls of said cell to provide an annular space, said container being formed of a porous material;
a cathode of inert conductive material substantially occupying said annular space, said cathode being permeable to said liquid stream;
an anode of active carbon substantially filling said container;
inlet and outlet means adjacent opposite ends, respectively, of said elongated cell and communicating with said annular space for permitting the flow of liquid stream through said cathode in the cell; and
circuit means connected to said electrodes, said circuit means being devoid of an electrical power source associated therewith other than said electrodes for driving a current through said electrodes.

References Cited by the Examiner

UNITED STATES PATENTS

| | | | |
|---|---|---|---|
| 2,000,815 | 5/1935 | Berl | 204—294 |
| 2,414,411 | 1/1947 | Marks | 204—195 |
| 2,651,612 | 9/1953 | Haller | 204—195 |
| 2,681,887 | 6/1954 | Butler | 204—294 |
| 2,757,132 | 7/1956 | Northrop | 204—195 |
| 2,805,191 | 9/1957 | Hersch | 204—1 |
| 3,028,317 | 4/1962 | Wilson et al. | 204—195 |
| 3,050,371 | 8/1962 | Dowson et al. | 204—195 |
| 3,117,034 | 1/1964 | Tirrell | 136—86 |
| 3,188,242 | 6/1965 | Kordesch et al. | 136—86 |
| 3,223,608 | 12/1965 | Hersch | 204—195 |
| 3,234,117 | 2/1966 | Rost et al. | 204—195 |
| 3,236,759 | 2/1966 | Robinson | 204—195 |

FOREIGN PATENTS

| | | |
|---|---|---|
| 1,235,331 | 5/1960 | France. |
| 521,773 | 5/1940 | Great Britain. |

OTHER REFERENCES

"Chemical Abstract," vol. 57 (August 1962), 319d.

JOHN H. MACK, *Primary Examiner.*

HOWARD S. WILLIAMS, *Examiner.*

T. H. TUNG, *Assistant Examiner.*